United States Patent [19]

Shipsey

[11] 3,744,892

[45] July 10, 1973

[54] OPTICAL PROJECTION DEVICE

[75] Inventor: Raymond Henry Shipsey, Glasgow, England

[73] Assignee: Charles Frank Limited

[22] Filed: Apr. 8, 1971

[21] Appl. No.: 132,477

[30] Foreign Application Priority Data

Apr. 15, 1970 Great Britain.................. 17,850/70

[52] U.S. Cl. .............................................. 353/63
[51] Int. Cl. ......................................... G03b 21/08
[58] Field of Search ................... 353/63, 64, 98, 99, 353/122

[56] References Cited
UNITED STATES PATENTS

| | | | |
|---|---|---|---|
| 1,365,599 | 1/1921 | Patterson | 353/63 |
| 3,547,530 | 12/1970 | Poole | 353/98 |
| 951,418 | 3/1910 | Dutton | 353/63 |
| 3,512,883 | 4/1970 | Noble | 353/64 |
| 2,200,637 | 5/1940 | Perkins | 353/64 |

Primary Examiner—Louis R. Prince
Assistant Examiner—A. J. Mirabito
Attorney—Young & Thompson

[57] ABSTRACT

An optical projector which combines the dual functions of episcope and overhead projector is described. The projector comprises a single casing housing a pivotally mounted mirrored member movable between two positions in one of which it permits light from a source to traverse a Fresnel lens and a transparent carrier thereon to an overhead lens system forming part of the overhead projector. In its other position the mirrored member permits reflection of image-forming light reflected from an opaque carrier to be directed through a projection lens forming part of the episcope. The material to be projected is supported by a single surface of the casing and the operative modes are alternative.

3 Claims, 1 Drawing Figure

PATENTED JUL 10 1973 3,744,892
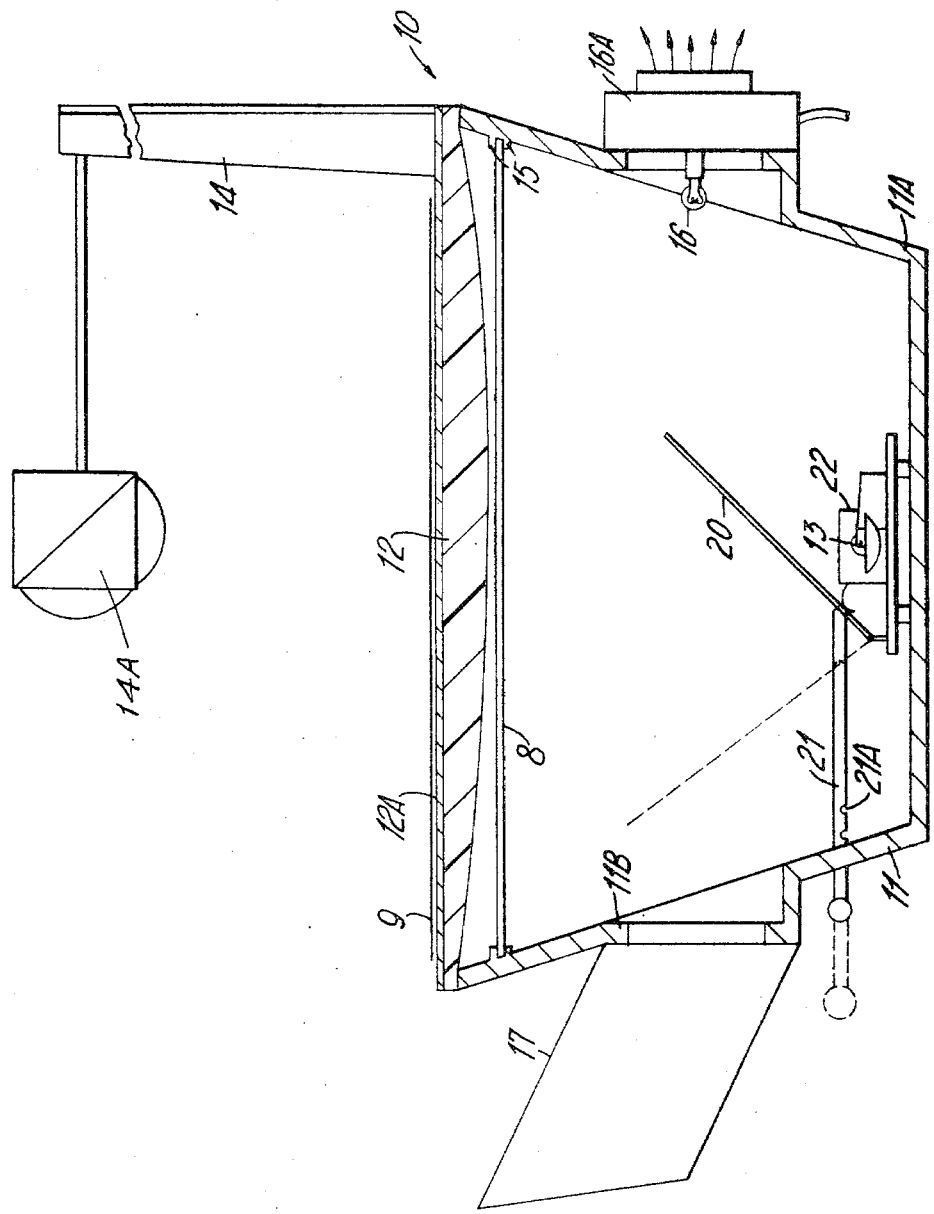
Inventor
RAYMOND HENRY SHIPSEY
By Young + Thompson
Attorneys

OPTICAL PROJECTION DEVICE

This invention relates to an optical projection device.

According to the present invention there is provided an optical projection device comprising at least one light source, a transparent carrier for a transparent information-bearing medium, a lens arranged to project light from the light source through the carrier towards an overhead lens system arranged to project the image onto a screen, means for receiving an opaque information-bearing medium, and means for directing light reflected from such opaque medium into a projection lens system for projecting the image onto said screen.

An embodiment of the present invention will now be described, by way of example, with reference to the accompanying drawing which shows the device partly in cross-section.

In the drawing the projection device 10 has a hollow, light-tight metal casing 11 in the form of an inverted truncated pyramid. The top of the casing 11 may be closed by a releasable frame (not shown) which carries a Fresnel lens 12 having a flat upper surface covered by a layer of plastics material 12A which supports a clear acetate sheet 9 carried between spaced rollers (not shown) and upon which sheet 9 information may be written by an operator for overhead projection. A projection lamp 13 is centrally disposed on the base of the casing 11 for illumination of the Fresnel lens 12.

An upstanding arm 14 mounted on the casing 11 supports a lens system (not shown) for receiving image-forming light from the sheet 9 and projecting an image onto a viewing screen which preferably is angled slightly to the vertical.

Intermediate the lamp 13 and the lens 12, and closely adjacent the lens 12, the casing 11 is provided with a slot 8 on one wall to receive a removable plate (not shown), and guide rails 15 for supporting the plate in position. The plate, when in position, is arranged to prevent light from the interior of the casing 11 falling upon the Fresnel lens 12, and the plate is also adapted to carry an opaque subject to be viewed. To project the opaque subject a side wall 11A of the casing 11 accommodates a second projection lamp 16 and the opposed casing wall 11B has an aperture over which fits a projection lens system 17 directed obliquely upwards towards the viewing screen. The opaque subject is then viewed by virtue of light emitted by the lamp 16 being reflected towards the subject by mirrored surfaces affixed to the interior casing walls.

A fan 16A is located adjacent the lamp 16 for extracting heat from the interior of the casing 11.

In order to select between viewing an opaque subject or a subject presented on the acetate sheet 9 a mirrored member 20 is pivotally mounted on the base of the casing 11 and is movable into one of three positions by a lever 21 projecting from the casing 11. In a first position the member 20 causes energisation of the lamp 13 and allows light to pass from the lamp 13 to the Fresnel lens 12 while preventing light reaching the lens system 17; in a second position the member 20 causes energisation of the lamp 16 and directs the image-forming light from an opaque subject to the lens system 17; and in a third position, intermediate the first and second positions, microswitches 22 are actuated to cause the lamps 13 and 16 to be connected in series and consequently to be energised at reduced power. As will be evident from the drawing the lever 21 is notched at 21A to enable any one of the three positions of the member 20 to be retained.

In operation, material to be shown by overhead projection is placed on the plastic surface 12A on the lens 12, the lever 21 is moved to its intermediate position, and the main power supply switched on. With the lever 21 in this position the lamps 13 and 16 are connected in series and come on at reduced brilliance thereby mitigating current-surging in the lamps when starting from cold. The member 20 is then moved by the lever 21 to its first position which causes the lamp 16 to be switched out and the lamp 13 to be switched to full brightness, and the material is projected.

At any time, opaque material such as a printed sheet may be projected by attaching it to the removable plate and inserting the plate as described above in the slot 8 of the casing, and then moving the mirrored member 20 to the second position. It is to be noted that the lever 21 has to move through the intermediate position to reach the second position and consequently the lamp 16 is energised at reduced power prior to being subjected to full power.

For ease of assembly and replacement of the lamps 13, 16 a modular construction is preferred wherein one module includes the lamp 13 and its associated reflector, and the microswitches 22, and a second module includes the lamp 16, the cooling fan 16A and the main electrical input with its associated fuses.

If the plate for carrying the opaque subject to be viewed is apertured the Fresnel lens 12 and its frame may be removed to enable bulky opaque objects to be projected.

What is claimed is:

1. An optical projection device combining an episcope and an overhead projector, comprising a casing having a light source therein, a projection lens system mounted on the casing and an overhead lens system supported by the casing, wherein the overhead projector is formed by a substantially transparent carrier adapted to receive information to be projected and a lens forming a surface of said casing and arranged to support said transparent carrier and to project light from the light source through the carrier towards said overhead lens system so as to form an image on a screen, and the episcope is formed by a removable support adjacent said lens for receiving an opaque information-bearing medium, said light source comprising two lamps, one of said lamps being disposed centrally under the transparent carrier for projecting said transparent carrier to said overhead lens system and the other being disposed to flood said support with light, said support being disposed between said one lamp and said lens, and a mirrored member having a flat mirror surface pivotally mounted for movement to a position intermediate said one lamp and said support, said flat mirror surface in said intermediate position reflecting the image of said opaque information-bearing medium into said projection lens system.

2. An optical projection device according to claim 1, wherein the mirrored member activates electrical switches which control the two lamps so that said other lamp is switched on when said support is in said second position and said mirrored member lies in said position intermediate said one lamp and the transparent carrier.

3. An optical projection device according to claim 1, wherein said lens is a Fresnel lens.

* * * * *